United States Patent
Taga et al.

(10) Patent No.: US 6,948,894 B2
(45) Date of Patent: Sep. 27, 2005

(54) MULTI-AXIAL MACHINE TOOL AND TABLE UNIT MOUNTING JIG

(75) Inventors: Mitsuru Taga, Nara (JP); Masaki Sugita, Nara (JP); Yasufumi Takai, Nara (JP); Koichi Kojo, Nara (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 119 days.

(21) Appl. No.: 10/693,393

(22) Filed: Oct. 24, 2003

(65) Prior Publication Data

US 2004/0121890 A1 Jun. 24, 2004

(30) Foreign Application Priority Data

Nov. 12, 2002 (JP) ..................................... P-2002-328235

(51) Int. Cl.⁷ .............................. B23C 1/14; B23C 1/06
(52) U.S. Cl. ....................... 409/235; 409/168; 409/224; 409/212; 409/134; 269/57; 269/58; 269/63; 269/71; 408/89
(58) Field of Search ............................... 409/168, 224, 409/235, 163–166, 198, 202, 212, 221, 219, 134; 408/71, 241 G, 89; 269/57–59, 63, 71; 74/608–609

(56) References Cited

U.S. PATENT DOCUMENTS

| | | | | |
|---|---|---|---|---|
| 3,248,101 A | * | 4/1966 | Muller et al. .................. | 269/58 |
| 3,273,879 A | * | 9/1966 | Floren .......................... | 269/61 |
| 3,361,033 A | * | 1/1968 | Muller ......................... | 409/168 |
| 3,822,959 A | * | 7/1974 | Tabard ......................... | 409/224 |
| 3,998,127 A | * | 12/1976 | Romeu ........................ | 409/224 |
| 4,644,635 A | | 2/1987 | Murai et al. | |
| 4,664,570 A | * | 5/1987 | Tsukiji et al. ................ | 409/168 |
| 4,858,290 A | * | 8/1989 | Hirose et al. ................. | 29/35.5 |
| 5,172,464 A | * | 12/1992 | Kitamura et al. ............ | 409/168 |
| 5,669,867 A | | 9/1997 | Hoppe | |
| 5,762,594 A | * | 6/1998 | Hoppe .......................... | 409/224 |
| 6,116,830 A | * | 9/2000 | Azema ......................... | 409/134 |
| 2001/0015117 A1 | * | 8/2001 | Hoppe .......................... | 82/117 |

FOREIGN PATENT DOCUMENTS

| | | |
|---|---|---|
| DE | 2833145 A1 * | 2/1980 |
| DE | 4034650 A1 * | 5/1992 |
| JP | 58-171229 A * | 10/1983 |

* cited by examiner

*Primary Examiner*—Erica Cadugan
(74) *Attorney, Agent, or Firm*—Osha-Liang LLP

(57) ABSTRACT

In the multi-axial machine tool, a table unit is detachably mounted on the upper surface of the interior portion of a portal bed disposed on a leg. The table unit comprises a table base fixed to the upper surface of the leg, a turning table which, when it is viewed at a reference working position, is turnably disposed on an inclined turning surface of the table base formed so as to be inclined in a descending manner toward a front side of the machine tool, and a work table disposed on the table support portion of the turning table so as to be turnable around axes lying in parallel with the axis of a spindle.

3 Claims, 9 Drawing Sheets

MULTI-AXIAL MACHINE TOOL AND TABLE UNIT MOUNTING JIG

BACKGROUND OF THE INVENTION

1. Field of the Invention

The present invention relates to a multi-axial machine tool and a table unit mounting jig which works a work placed on a work table in a plurality of axial directions.

2. Related Art

As a conventional multi-axial machine tool, there is known a machine tool structured such that a recessed portion is integrally formed in the front-side portion of a column, one half section of a turning table is fitted with and turnably supported by the support surface of the recessed portion which is inclined in a descending manner toward a front side of the machine tool at an angle of 45°, and a table is turnably carried on the upper surface of the other half section of the turning table (see e.g. U.S. Pat. No. 5,669,867 to Hoppe).

Also, as a conventional multi-axial machine tool, there is also known a machine tool structured such that a base table is arranged in the interior of a portal bed disposed on a base in such a manner that it can be moved into and from the interior portion of the portal bed, a turning table is arranged on the base table in such a manner that it can be swung around a swing axis inclined forwardly and upwardly at an angle of 45° with respect to the axis of a spindle, and a work table is turnably supported by the turning table (see e.g. U.S. Pat. No. 4,644,635 to Murai).

However, as disclosed in U.S. Pat. No. 5,669,867, in the case of a structure in which a turning table is fitted with and turnably supported by the inclined surface of a recessed portion formed in a column integrally therewith, the mounting precision of the turning table onto the inclined surface depends on the working precision of the machine tool; and, therefore, it is difficult to adjust the mounting precision and it is also difficult to maintain the mounting precision after adjusted. Also, in case where there arises the need to detach the turning table from the inclined surface because a trouble has occurred in the turning table, it is difficult to detach the turning table.

On the other hand, as disclosed in the above-cited patent literature 2, in the case of a structure in which a turning table is carried on a base table arranged on a leg so as to move into and from the leg, cut chips produced in a cutting operation are easy to accumulate in the interior of the machine tool, which requires a large number of man-hours to remove the accumulated cut chips.

SUMMARY OF THE INVENTION

The present invention aims at eliminating the drawbacks found in the above-cited conventional structures. Accordingly, it is an object of the invention to provide a multi-axial machine tool which not only can facilitate the adjustment of the mounting precision of the turning table, the maintenance of the adjusted mounting precision and the removal of the turning table but also, in the cutting operation, can prevent the cut chips from accumulating in the interior of the machine tool.

According to the invention, a multi-axial machine tool includes:

a leg;

a portal bed disposed on an upper face of the leg;

a spindle head for rotatably supporting a spindle around a spindle axis substantially in vertical for multi-axially working to a work using a tool attached to the spindle, a table unit detachably mounted on the upper face of the leg so as to be accommodated inside of the bed, the table unit including:

a table base fixed to the upper face of the leg, a turning table turnably disposed on an inclined turning surface of the table base formed so as to be inclined in a descending manner toward a front side of the machine tool, and a work table supported on the turning table so as to be turnable around an axis in parallel with the spindle axis when the work table is located at a reference working position.

Here, the term "reference working position" used in the invention means a state in which the angle position of the turning table 10 is set such that the axis of the work table 11 lies in parallel with the spindle axis.

According to the invention, the inclined turning surface of the table base is inclined at an angle of smaller than 45° with respect to the spindle axis.

According to the invention, a clearance is formed between the inclined turning surface of the table base and portal bed, and the clearance is covered with a cover member.

According to the invention, there is provided a multi-axial machine tool for multi-axially working a work using a tool attached to a spindle, comprising:

a turning table turnably disposed on an inclined turning surface which is inclined in a descending manner toward a front side of the machine tool at an angle of smaller than 45° with respect to a axis of the spindle; and a work table supported on the turning table, the work table being turnable around an axis substantially in parallel with the axis of the spindle when the turning table is located at a reference working position.

Here, in the invention, the reason for use of the expression "the inclined turning surface inclined in a descending manner toward a front side of the machine tool at an angle of smaller than 45° with respect to the spindle axis" is that, when the turning table is swung by angle of 180°, an angle between the axis of the work table and thus the axis of the work and the spindle axis can be made to vary widely from an angle of 0° to an angle of 90° or larger. Specifically, this means that the angle of the inclined turning surface with respect to the spindle axis is set in the angle range, for example, from an angle of 25° to an angle of smaller than 45°.

According to the invention, there is provided a mounting and detaching jig for mounting and detaching a table unit with respect to a multi-axial machine tool having a leg and a portal bed, comprising:

a support member to be inserted between a upper face of the leg and a lower face of the table unit from a front side of the machine tool, and a lift mechanism for raising and lowering the support member, in the case that the table unit is detached from the machine tool, after the table unit is detached from the upper face of the leg, the support member is raised to thereby move the table unit onto the support member, and the table unit is then moved outwardly of the portal bed; and, in case the table unit is mounted on the table unit, the table unit placed onto the support member held at a raised position is displaced to a mounting position, the support member is then lowered so that the table unit is placed onto a surface of the leg, so that the table unit is fixed to the surface of the leg.

According to the invention, the table unit is structured not only such that the table base, the turning table turnably disposed on the inclined turning surface of the table base, and the work table placed on the table support portion of the turning table are assembled together into a unit body, but also such that it can be mounted onto and detached from the upper surface of the leg. Thanks to this, the table base and turning table can be assembled outside the machine tool, the assembling precision thereof can be enhanced, and the thus-enhanced assembling precision can be maintained easily and positively. Also, when the table unit requires maintenance, the table unit can be detached externally of the machine tool for maintenance, thereby being able to facilitate the maintenance operation of the table unit.

According to the invention, since the inclined turning surface of the table base is formed so as to incline in a descending manner toward a front side of the machine tool at an angle of smaller than 45° with respect to the spindle axis, by turning the turning table by 180°, the axis of the work table and thus the axis of the work can be varied in a wide range from an angle of 0° to an angle of larger than 90°. Therefore, when compared with the conventional machine tool in which the axis of the work can be varied only from an angle of 0° to an angle of 90°, the work can be axis-worked in a wide range.

According to the invention, because the clearance between the inclined turning surface of the table base and portal bed is covered with the cover member, it is possible to prevent cut chips from piling up between the table unit and portal bed, thereby being able to reduce the number of man-hours necessary for the cut powers discharging operation.

According to the invention, since the turning table is turnably disposed on the inclined turning surface which is inclined in a descending manner toward a front side of the machine tool at an angle of smaller than 45° with respect to the spindle axis, by turning the turning table 180°, the axis of the work table and thus the axis of the work can be varied in a wide range from an angle of 0° to an angle of larger than 90°. Therefore, when compared with the conventional machine tool in which the axis of the work can be varied only from an angle of 0° to an angle of 90°, the work can be axis-worked in a wide range.

According to the invention, because the table unit mounting and detaching jig comprises the support member to be inserted from the front surface side of the machine tool into between the leg upper surface and the bottom surface of the table unit and the lift mechanism for raising and lowering the support member, for detaching the table unit, after the fixing of the table unit to the leg upper surface is released, the inserted support member may be raised up to thereby move the table unit onto the support member and the table unit may be then slided externally of the portal bed, so that the table unit can be detached from the leg upper surface easily and positively.

Also, for mounting the table unit onto the leg, the table unit may be placed onto the support member held at its raised position and may be then moved and fixed to its mounting position; and, after then, the support member may be lowered to thereby move the table unit onto the placement surface of the leg and may be then fixed to the leg place surface. That is, the table unit can be fixed onto the upper surface of the leg easily and positively.

DETAILED DESCRIPTION OF THE PREFERRED EMBODIMENTS

Now, description will be given below of the mode for carrying out the invention with reference to the accompanying drawings.

Figure 1:
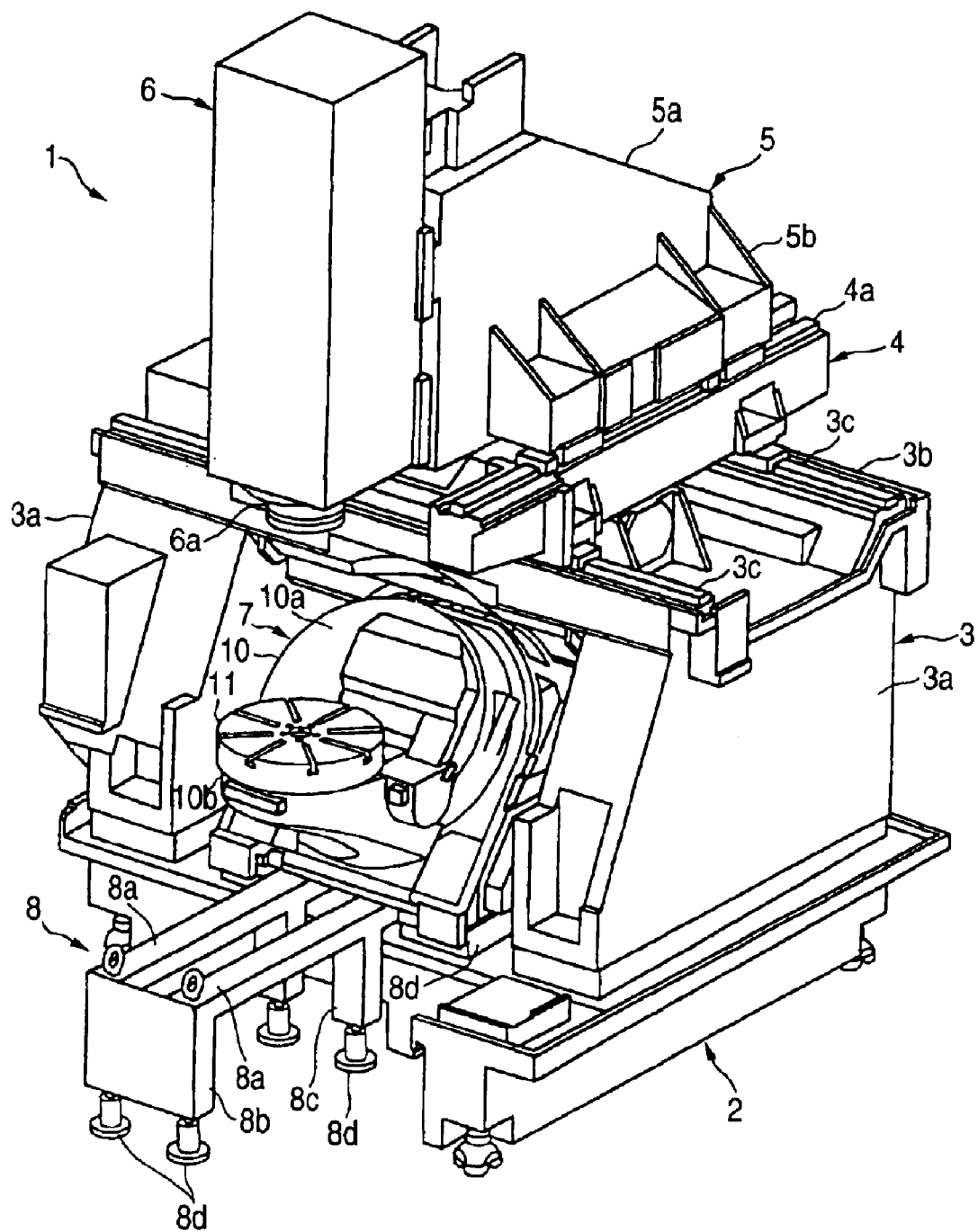
FIG. 1 is a perspective view of a multi-axial machine tool according to an embodiment of the invention, when it is viewed from the front side thereof.
Figure 2:
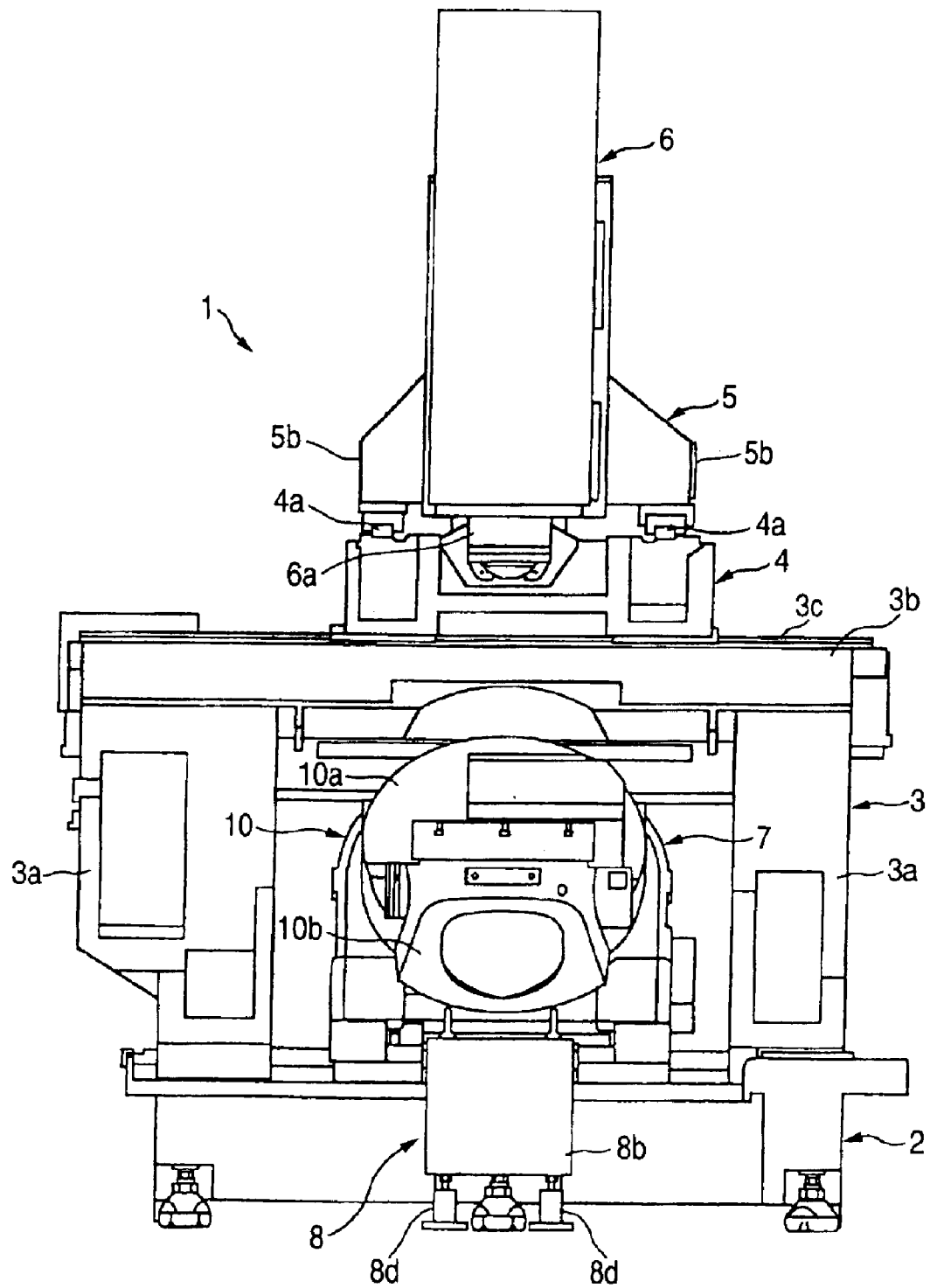
FIG. 2 is a front view of the above machine tool.
Figure 3:
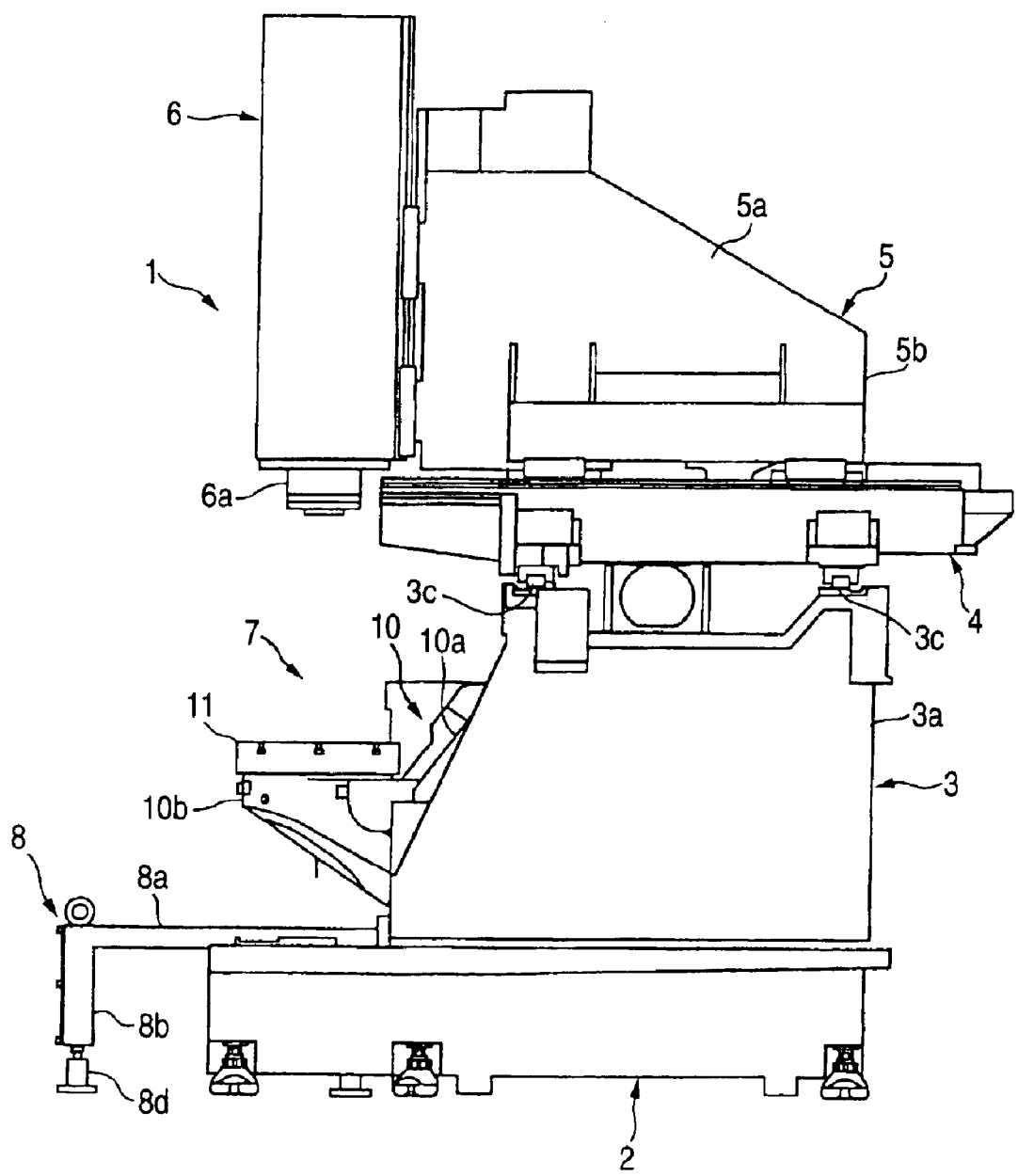
FIG. 3 is a right side view of the above machine tool.
Figure 4:
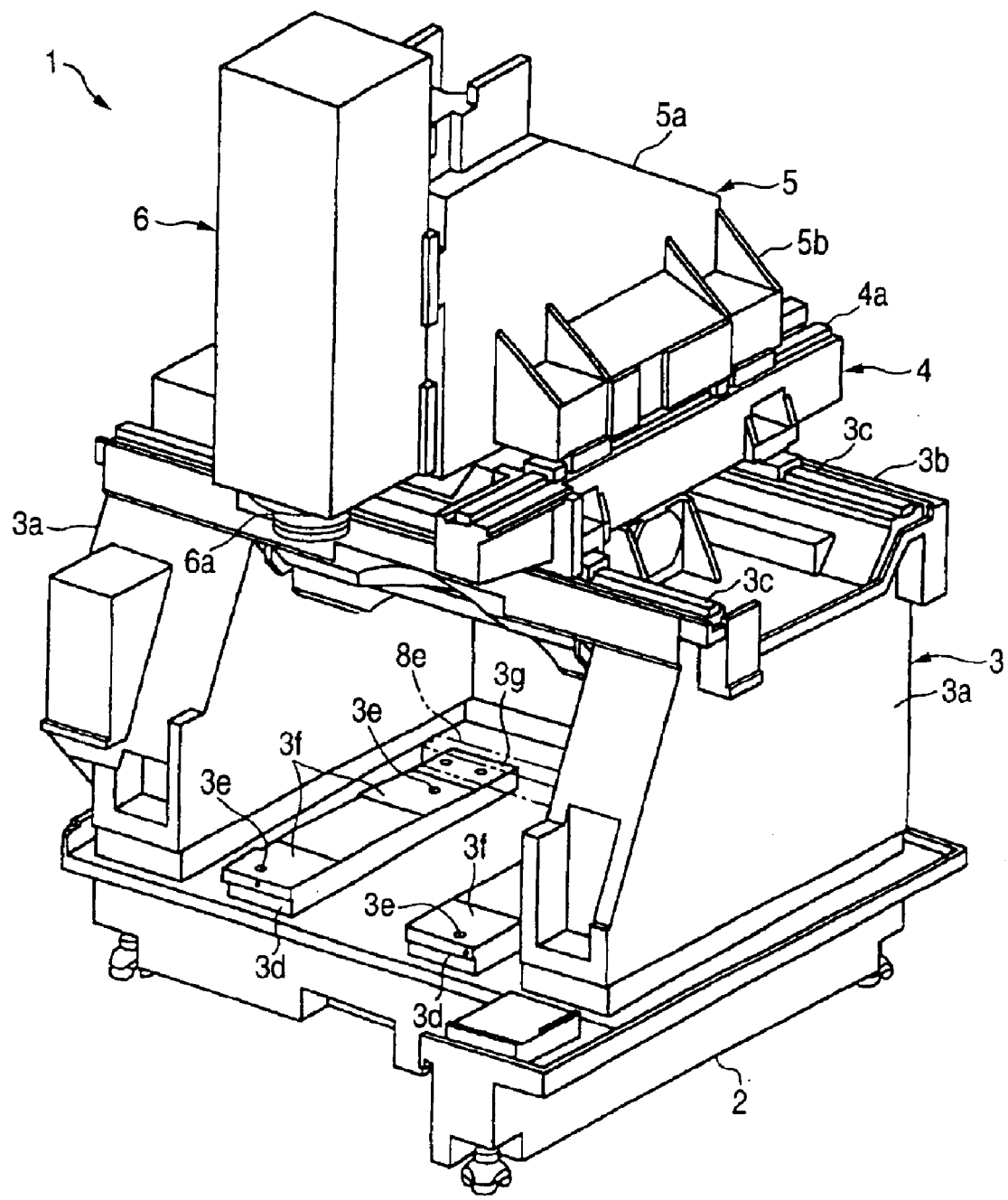
FIG. 4 is a perspective view of the above machine tool with a table unit detached therefrom, when it is viewed from the front surface side thereof.
Figure 5:
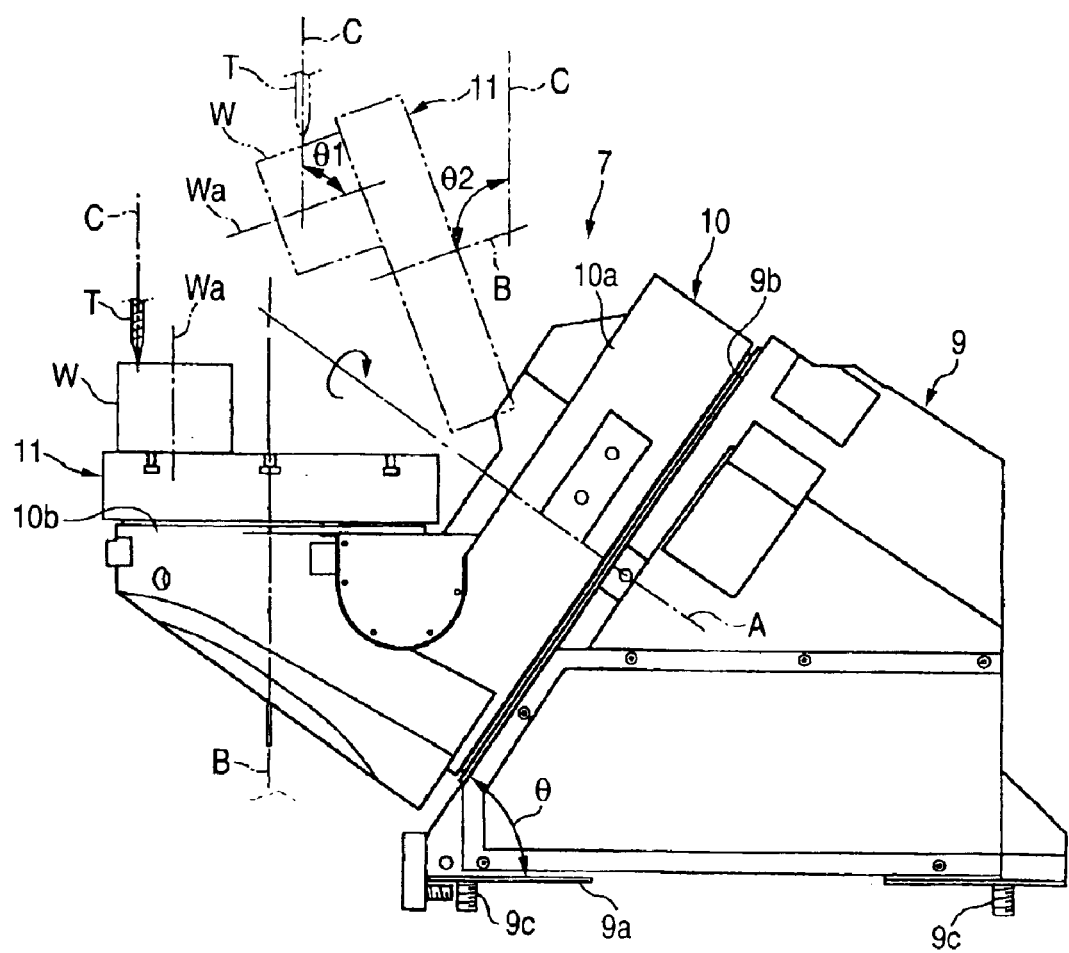
FIG. 5 is a right side surface of the table unit of the above machine tool.
Figure 6:
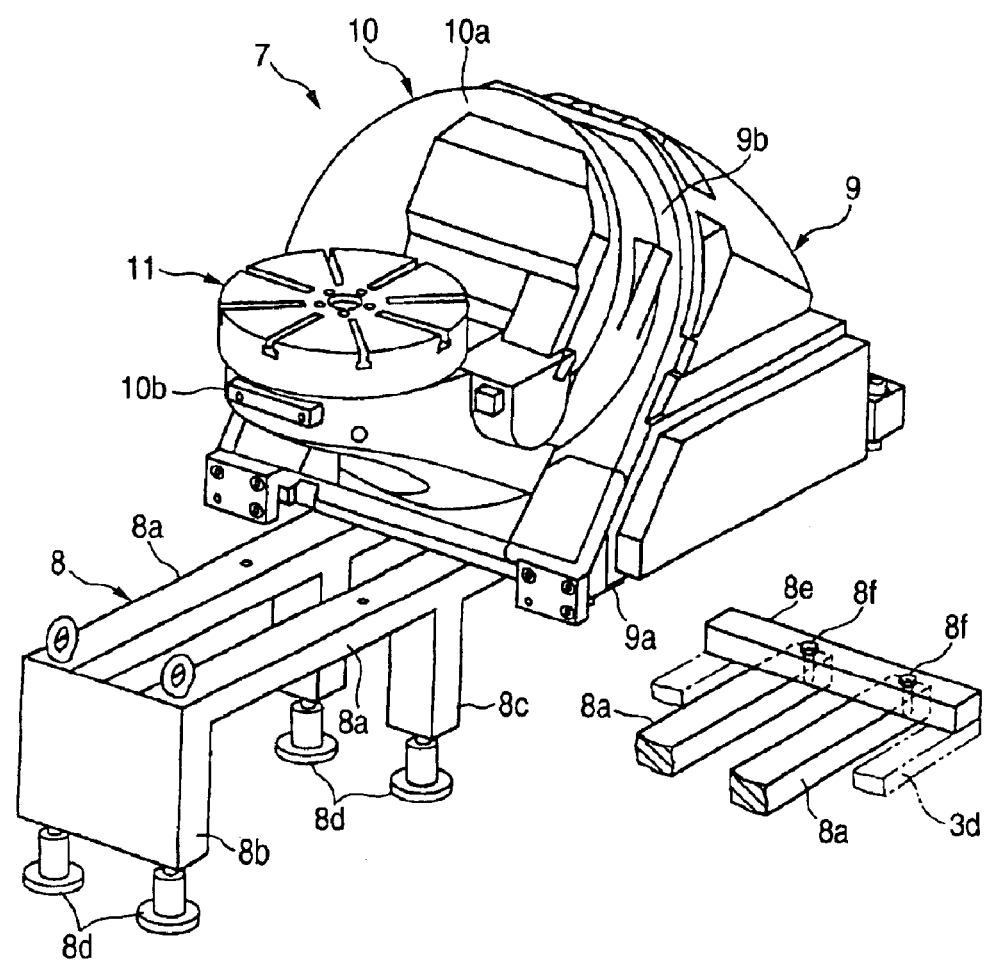
FIG. 6 is a perspective view of the table unit of the above machine tool and a jig, in which the table unit is placed on the jig, when they are viewed from the front side of the machine tool.

FIGS. 1 to 6 show a multi-shaft machine tool (machining center) according to an embodiment of the invention. Specifically, FIG. 1 is a perspective view of the present machine tool, FIG. 2 is a front view thereof, FIG. 3 is a right side view thereof, FIG. 4 is a perspective view thereof with a table unit detached therefrom, FIG. 5 is a right side view of a table unit, and FIG. 6 is a perspective view of the table unit. By the way, the terms, [front and rear], [right and left] and [upward and downward] referred in the present embodiment mean [front and rear], [right and left] and [upward and downward] when the machine tool is viewed from the front side.

Figure 7:
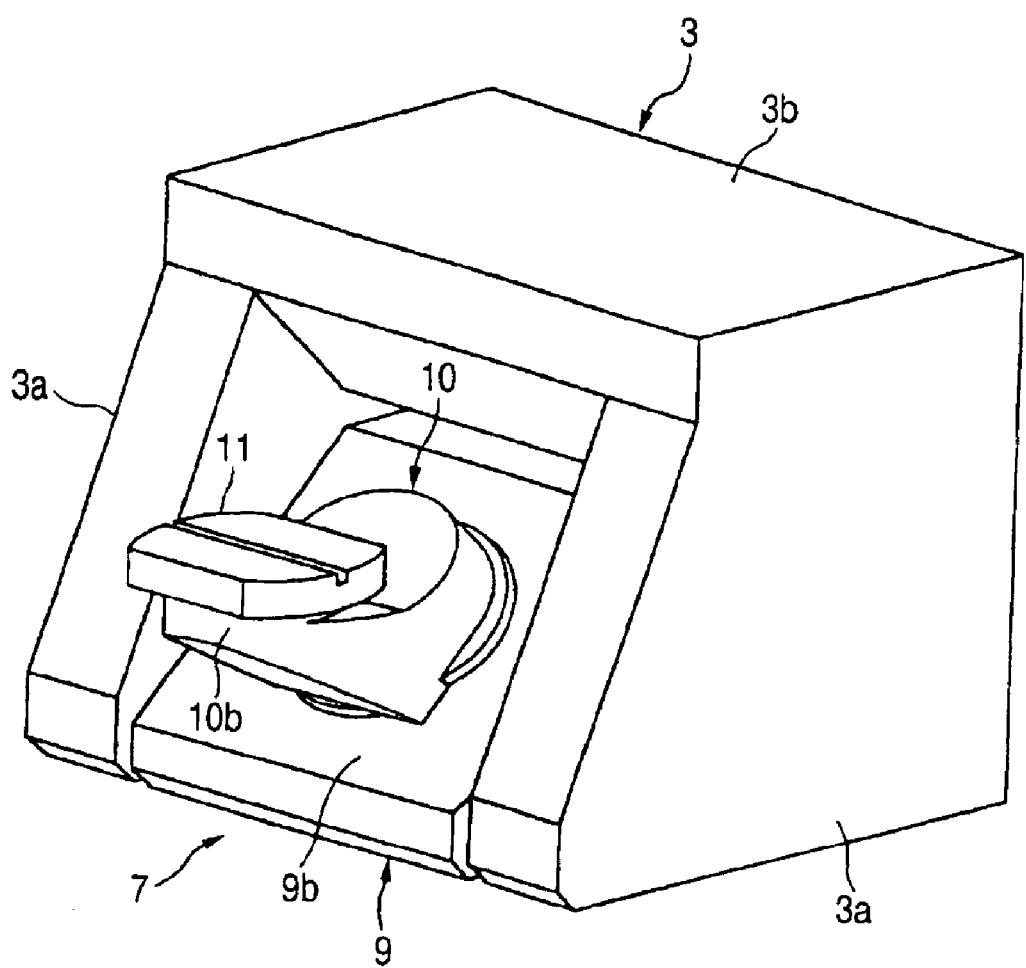
FIG. 7 is a perspective view of a portal bed and a table unit employed in a machine tool according to the invention, showing the position relationship between them typically.
Figure 8:
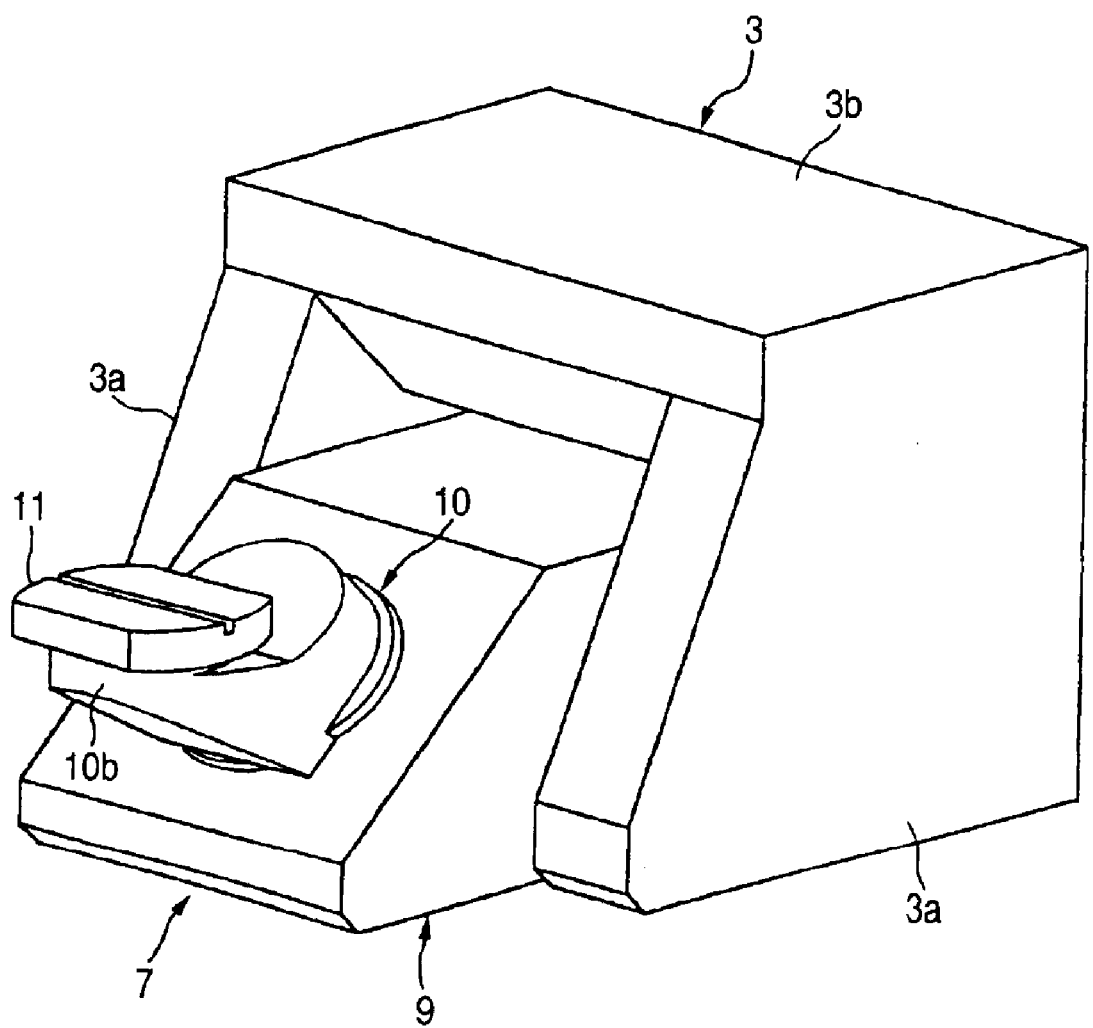
FIG. 8 is a perspective view of a table unit employed in a machine tool according to the invention, typically showing a state in which the table unit is detached.
Figure 9:
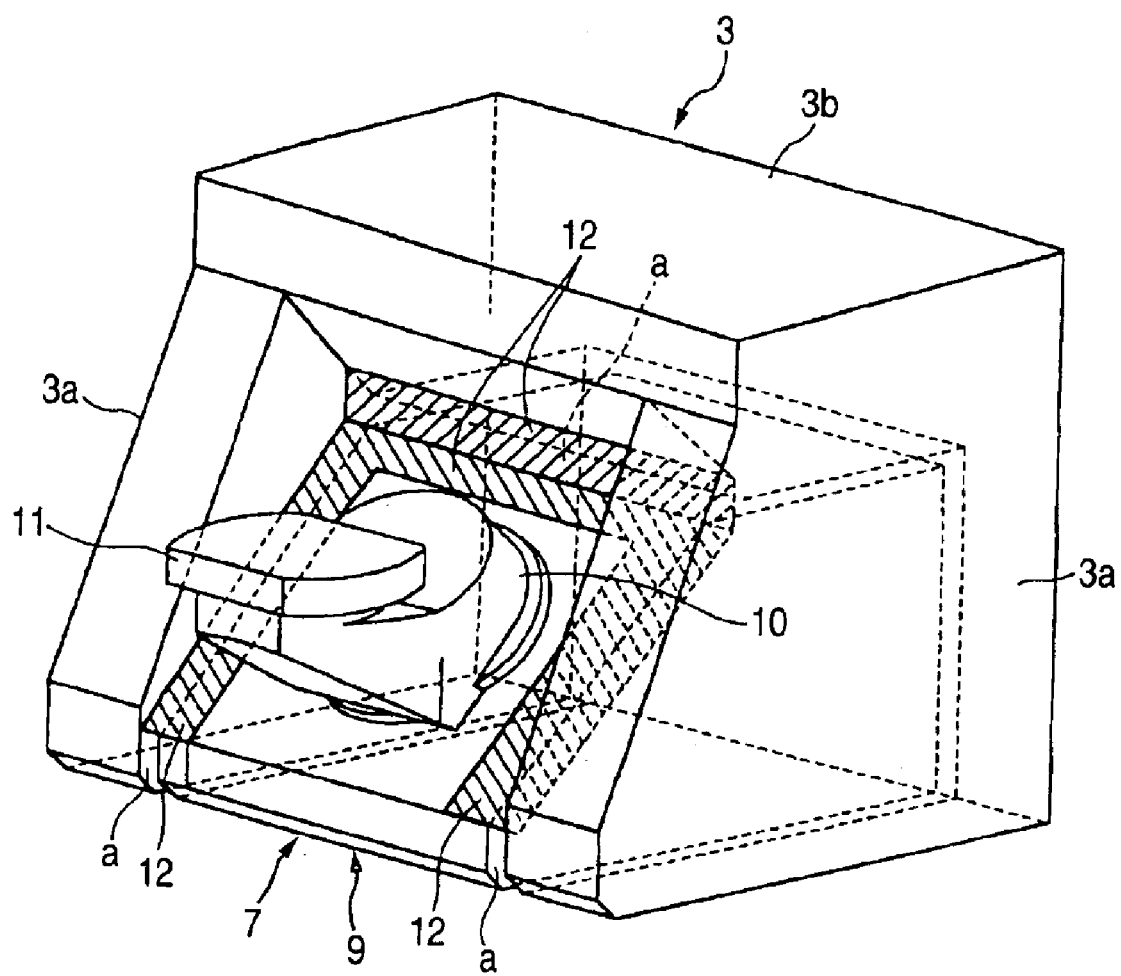
FIG. 9 is a perspective view of a table unit and a portal bed employed in a machine tool according to the invention, typically showing a state in which a clearance between them is covered.

FIG. 7 is a perspective view of a portal bed and a table unit employed in a machine tool according to the invention, showing the position relationship between them typically. FIG. 8 is a perspective view of a table unit employed in a machine tool according to the invention, typically showing a state in which the table unit is detached. FIG. 9 is a perspective view of a table unit and a portal bed employed in a machine tool according to the invention, typically showing a state in which a clearance between them is covered.

In FIG. 1, reference character 1 designates a multi-axial machine tool. The multi-shaft machine tool 1 comprises a leg 2 to be installed on a base, a portal bed 3 carried on and fixed to the leg 2, a saddle 4 carried on the portal bed 3 so as to be movable in the X-axis (right and left) direction, a column 5 carried on the saddle 4 so as to be movable in the Y-axis (front and rear) direction, a spindle head 6 carried on the front surface of the column 5 so as to be movable in the Z-axis (upward and downward) direction, and a table unit 7 disposed in the interior of the portal bed 3 of the leg 2. By the way, reference character 8 stands for a jig which is used to mount and detach the table unit 7.

The leg 2 is a block-shaped member having a substantially rectangular shape when it is viewed from top. Also, the portal bed 3 is fixedly secured to the upper surface of the leg 2, and includes right and left leg portions 3a, 3a and a beam portion 3b disposed between and over the right and left leg portions 3a, 3a for connecting and fixing them to each other; and, the portal bed 3 is formed as a portal shape which is opened in the front and rear direction thereof.

The saddle 4 is formed as a thick-plate-shaped member having a rectangular shape when it is viewed from top and can be moved in the right and left direction on and along a pair of front and rear guide rails 3c, 3c respectively disposed on the beam portion 3b. Also, the column 5 includes two leg portions 5b, 5b on the right and left side portions of the block-shaped main body portion 5a thereof; and, the leg portions 5b, 5b are placed on a pair of right and left guide rails 4a, 4a disposed on the saddle 4 in such a manner that they can be moved in the front and rear direction. Further, the spindle head 6 is formed as a prism-shaped member in which a spindle 6a is inserted and disposed so as to direct in the vertical direction while being rotatable and is also supported in such a manner that it can be moved in the upward and downward direction by a guide rail disposed on the front surface of the main body portion 5a of the column 5.

The table unit 7 comprises a table base 9 fixed to the leg 2, a turning table 10 supported by the table base 9 in such a manner that it can be swung, and a disk-shaped work table 11 supported on the turning table 10 so as to be turnable.

The table base 9 is formed as a block-shaped member. Specifically, the table base 9 includes a mounting surface 9a the bottom portion of which is formed as a horizontal surface, and an inclined turning surface 9b inclined in a descending manner toward a front side of the machine tool with respect to the mounting surface 9a so as to have an inclination angle θ larger than 45°; specifically, for example, it has an inclination angle of 55° with respect to the mounting surface 9a. Therefore, the inclined turning surface 9b has an inclination angle of smaller than 45° with respect to the axis C of the spindle 6a, specifically, an angle of 35°.

Also, the table base 9 is fixed to the upper surface of the leg 2 in the following manner: that is, the mounting surface 9a is arranged on the placement surfaces 3f, 3f of support bases 3d, 3d respectively interposed between the right and left leg portions 3a, 3a of the portal bed 3 set on the upper surface of the leg 2, bolts 9c are inserted into the flange portions of the table base 9 from above and, the bolts 9c are then screwed into screw holes 3e formed in the placement surfaces 3f.

The turning table 10 is composed of a disk-shaped swing support portion 10a and a disk-shaped table support portion 10b which are united together into a V shape (when it is viewed from the side surface thereof (see FIG. 5)) having an angle corresponding to the inclination angle θ, specifically, for example, 125° (=180−θ).

The swing support portion 10a of the turning table 10 is supported on the inclined turning surface 9b in such a manner that it can be swung about a rotation axis A lying at right angles to the inclined surface 9b. Also, the work table 11 is supported by the table support portion 10b in such a manner that it can be swung about an axis B lying in parallel with the axis C of the spindle 6a.

Also, as schematically shown in FIG. 9, a clearance between the outer peripheral portion of the table unit 7 and the inner peripheral portion of the portal bed 3 is covered with a cover plate 12. The cover plate 12 is disposed so as to extend along the peripheral edge surface of the inclined turning surface 9b, while cut chips produced in the cutting operation can be discharged in such a manner that they move along the cover plate and inclined turning surface 9b and fall down onto the front surface side of the machine tool. And, the cover plate also prevents the cut chips from entering the interior of the machine tool through the clearance between the table unit 7 and portal bed 3.

The jig 8 is composed of a pair of support members 8a, 8a each made of a rectangular-shaped rod, a pair of support legs 8b, 8c respectively mounted on their associated support members 8a, 8a and height adjusting jacks 8d respectively mounted on the lower ends of the support legs 8b, 8c. The support members 8a, 8a respectively have a shape which overhangs from their associated support legs 8c slightly longer than the deep side of the table unit 7.

Next, description will be given below of the operation effects of the present embodiment.

In the multi-axial machine tool 1 according to the present embodiment, by moving the spindle head 6 in the X- Y- Z-axis directions, a working operation, for example, a drilling operation is enforced on a work W placed on the work table 11 in many kinds of axial directions using a tool T attached to the spindle 6a.

In case where, for example, the turning table 10 is set at a reference working position shown by a solid line in FIG. 5, the axis Wa of the work W on the work table 11 lies in parallel with the axis C of the spindle 6a. That is, a hole having an axis parallel to the axis Wa of the work W is drilled in the work W using the tool T.

On the other hand, as the turning table 10 is swung about the rotation axis A, the direction of the work table 11 and thus the direction of the work W vary with respect to the spindle axis C in the range of 0°~θ2 (for example, 110°). Therefore, by controlling the swing angle of the turning table 10 properly, the work W can be drilled in directions having various angles with respect to the axis Wa of the work W. In case where the turning table 10 is swung, for example, about 180° around the rotation axis A from the reference working position shown by the solid line, the work table 11 and work W are caused to face in such directions as shown by two-dot chained lines in FIG. 5, thereby being able to execute a hole drilling operation having an angle of θ1 smaller than 90° with respect to the work axis Wa on the work W using the tool T.

As described above, according to the present embodiment, since the angle of the table base 9 with respect to the spindle axis C of the inclined turning surface 9b of the table base 9 is set for an angle (specifically, 35°) smaller than 45° and the turning table 10 is arranged so as to be turnable ±180° with respect the reference working position, the angle θ2 of the axis B of the work table 11 with respect to the axis C of the spindle 6a is allowed to vary in the wide range of ±110°, so that the drilling operation can be carried out on the work W in more various kinds of axial directions.

For example, in case where the outer periphery of the 180°-arc-shaped portion of a semi-cylindrical shape is worked in the arc direction, in the case of the conventional structure, the working area must be worked while dividing it into two 90° sections. Therefore, in the conventional structure, a stepped portion is easy to occur in the joint portion of the working area. On the other hand, in the case of the structure according to the invention, since it is not necessary to divide the working area, there exists no working joint portion in the working area.

Here, the table unit 7 according to the present embodiment can be produced in the following manner: that is, the turning table 10 is previously placed at a given position on the inclined turning surface 9b of the table base 9 outside the present machine tool 1 and the position of the turning table 10 is then adjusted, thereby integrating the table base 9 and turning table 10 into a single unit. And, such the unitized table unit 7 is placed onto the leg 2.

To place the table unit 7 onto the leg 2, firstly, the jig 8 is set on the front surface of the machine tool 1, the pair of right and left support members 8a, 8a of the jig 8 are respectively inserted between the support bases 3d, 3d disposed on the leg 2, and the leading end portions of the support members 8a, 8a are fixed to the lower surface of a support beam 8e disposed between and over the right and left support bases 3d, 3d by bolts 8f.

At the then time, the upper surfaces of the support members 8a, 8a are held slightly higher than the placement surfaces 3f, 3f of the support bases 3d, 3d by adjusting the tightening amounts of the jacks 8d of the support legs 8b, 8c constituting the lift mechanisms of the support members 8a, 8a as well as the bolt tightening amounts of the leading end portions of the support members 8a with respect to the support beam 8e. In this state, the table unit 7 is placed onto the portions of the support members 8a, 8a that are situated outside the portal bed 3, and is then slided into the interior of the machine tool. When the table unit 7 reaches its given position, by adjusting the jacks Bd and the like, the support members 8a, 8a are lowered down in such a manner that their upper surfaces are situated slightly lower than the placement surfaces 3f; and, the table unit 7 is then moved onto the placement surfaces 3f of the support bases 3d, 3d. After then, the jig 8 is removed, and the table unit 7 is fine adjusted in the respective axial-direction positions and height thereof and is then fixed onto the support bases 3d using the bolts 9c.

By the way, when detaching the table unit 7 from its installation position for maintenance thereof or for other reasons, the reversed operation of the above-mentioned mounting operation may be carried out. That is, the support members 8a of the jig 8 are inserted between the leg 2 and the mounting surface 9a of the table unit 7; the support members 8a are raised upwardly and the table unit 7 is moved onto the support members 8a; and then, the table unit 7 is slided outwardly of the machine tool.

As described above, according to the present embodiment, the table unit 7 is detachably fixed by tightening bolts to the portion between the right and left leg portions 3a, 3a of the portal bed 3 of the leg 2, and the table base 9 and turning table 10 are assembled and united together into a unit outside the machine tool; and, after then, the table unit 7 is mounted onto the leg 2 through the mounting surface 9a (which is formed as a horizontal surface) of the table unit 7. Thanks to this, the assembling precision of the table unit 7 can be enhanced easily and also the thus enhanced precision can be maintained easily and positively.

Also, in mounting and detaching the table unit 7, there is employed a method in which the specially-designed jig 8 is prepared, the table unit 7 is supported by the support members 8a of the jig 8 through the mounting surface 9a of the table unit 7 and is raised and lowered, and the table unit 7 is then slided on and along the support members 8a. This can facilitate the mounting and detachment operation of the table unit 7 and also can reduce a large-scale crane operation.

Further, since the clearance between the outer periphery of the table unit 7 and the inner periphery of the portal bed 3 is covered with the cover plate, the cut chips produced during the cutting operation can be easily discharged along the inclined turning surface 9b of the table unit 7 to the front surface of the machine tool, and the cut powers can be prevented from piling up between the table unit 7 and portal bed 3, thereby being able to reduce the number of man-hours necessary for the cut chips discharging operation.

By the way, in the above-illustrated embodiment, description has been given of a case in which the portal bed 3 is formed as a portal shape which is opened in the front and rear direction. However, a portal bed according to the invention may also be formed such that the rear portion thereof is closed, or that only the upper half section thereof is opened.

In this embodiments, as shown in FIGS. 7 to 9, there is provided the multi-axial machine tool structured such that the portal bed 3 is disposed on the leg 2, there is disposed the spindle head 6 for rotatably supporting the spindle 6 around a substantially vertical axis, and a work placed on the work table 11 is multi-axially worked using a tool attached to the spindle, wherein the table unit 7 is detachably mounted on the upper surface of the interior portion of the portal bed disposed on the leg 2; and, the table unit 7 comprises the table base 9 fixed to the upper surface of the leg, the turning table 10 turnably disposed on the inclined turning surface 9b of the table base 9 formed so as to be inclined in a descending manner toward a front side of the machine tool, and the work table 11 turnably disposed on the table support portion 10b of the turning table 10 around an axis lying in parallel with the spindle axis when it is viewed at a reference working position.

According to the invention, the table unit 7 is structured not only such that the table base 9, the turning table 10 turnably disposed on the inclined turning surface of the table base 9, and the work table 11 placed on the table support portion 10b of the turning table 10 are assembled together into a unit body, but also such that it can be mounted onto and detached from the upper surface of the leg 2. the table base 9 and turning table 10 can be assembled outside the machine tool, the assembling precision thereof can be enhanced, and the thus-enhanced assembling precision can be maintained easily and positively. Also, when the table unit 7 requires maintenance, the table unit 7 can be detached externally of the machine tool (see FIG. 8) for maintenance, thereby being able to facilitate the maintenance operation of the table unit 7.

What is claimed is:

1. A multi-axial machine tool comprising:
   a leg;
   a portal bed disposed on an upper face of the leg;
   a spindle head for rotatably supporting a spindle for rotation around a spindle axis substantially in vertical for multi-axially working a work using a tool attached to the spindle,
   a table unit detachably mounted on the upper face of the leg so as to be accommodated inside of the bed, the table unit including:
      a table base fixed to the upper face of the leg,
      a turning table turnably disposed on an inclined turning surface of the table base formed so as to be inclined in a descending manner toward a front side of the machine tool, and
      a work table supported on the turning table so as to be turnable around an axis in parallel with the spindle axis when the work table is located at a reference working position;
   wherein there is formed a clearance between the inclined turning surface of the table base and the portal bed, and the clearance is covered with a cover member extending from the inclined turning surface to the portal bed.

2. A multi-axial machine tool according to claim 1, wherein the inclined turning surface of the table base is inclined at an angle of smaller than 45° with respect to the spindle axis.

3. A multi-axial machine tool for multi-axially working a work using a tool attached to a spindle, comprising:
   a turning table turnably disposed on an inclined turning surface which is inclined in a descending manner toward a front side of the machine tool at an angle of smaller than 45° with respect to a rotation axis of the spindle; and
   a work table supported on the turning table, the work table being turnable around an axis substantially in parallel with the axis of the spindle when the turning table is located at a reference working position;
   wherein there is formed a clearance between the inclined turning surface and a portal bed to which the spindle is attached, and the clearance is covered with a cover member extending from the inclined turning surface to the portal bed.

* * * * *